(12) United States Patent
Bayne et al.

(10) Patent No.: US 11,491,416 B2
(45) Date of Patent: Nov. 8, 2022

(54) CRYOGENIC SOLID-LIQUID EXTRACTOR

(71) Applicants: Eugene Bayne, Baton Rouge, LA (US); Adrian Allen, New Orleans, LA (US)

(72) Inventors: Eugene Bayne, Baton Rouge, LA (US); Adrian Allen, New Orleans, LA (US)

(*) Notice: Subject to any disclaimer, the term of this patent is extended or adjusted under 35 U.S.C. 154(b) by 629 days.

(21) Appl. No.: 16/429,627

(22) Filed: Jun. 3, 2019

(65) Prior Publication Data

US 2019/0366232 A1 Dec. 5, 2019

Related U.S. Application Data

(60) Provisional application No. 62/680,055, filed on Jun. 4, 2018.

(51) Int. Cl.
| | | |
|---|---|---|
| *B01D 11/04* | (2006.01) | |
| *B01D 1/00* | (2006.01) | |
| *B01D 5/00* | (2006.01) | |
| *C11B 9/02* | (2006.01) | |

(52) U.S. Cl.
CPC ............ *B01D 11/04* (2013.01); *B01D 1/0041* (2013.01); *B01D 5/0006* (2013.01); *B01D 5/009* (2013.01); *C11B 9/025* (2013.01); *B01D 5/006* (2013.01); *B01D 5/0072* (2013.01)

(58) Field of Classification Search
CPC .... B01D 11/04; B01D 1/0041; B01D 5/0006; B01D 5/006; B01D 5/009; B01D 5/0072; C11B 9/025
See application file for complete search history.

(56) References Cited

U.S. PATENT DOCUMENTS

| | | | |
|---|---|---|---|
| 5,516,923 A * | 5/1996 | Hebert | ................. B01D 35/153 554/12 |
| D413,678 S | 9/1999 | Anderson et al. | |
| 7,002,029 B2 * | 2/2006 | Davis | ................. B01D 11/0203 554/16 |
| 9,327,210 B1 * | 5/2016 | Jones | ................. B01D 11/0215 |
| 9,669,328 B2 * | 6/2017 | Jones | ................... A61K 36/185 |
| 9,687,754 B2 * | 6/2017 | Ellis | .......................... C11B 1/10 |

(Continued)

OTHER PUBLICATIONS

CG-1375 Liquid/Solid Extractor, Gregar*, Received: May 1, 2018, 1 page.

*Primary Examiner* — Jonathan Miller
(74) *Attorney, Agent, or Firm* — Pearl Cohen Zedek Latzer Baratz LLP

(57) ABSTRACT

A cryogenic solid-liquid extractor comprises a reboiler for evaporating an extraction solvent; a cryogenic heat exchanger for condensing the vaporized extraction solvent to a liquid extraction solvent by passing the vaporized extraction solvent through a container cooled by a cryogenic cooling agent comprising a mixture of a cryogenic solvent and a compressed, liquified or solidified gas to cool the extraction solvent to a temperature below the freezing point of water and above the freezing point of the extraction solvent; a cryogenic extractor for passing the condensed liquid extraction solvent through a solid organic material to extract solvent-soluble material, but not water-soluble material, from the solid organic material, wherein the cryogenic solid-liquid extractor returns the condensed liquid extraction solvent containing extracted material to the reboiler to repeat the vaporization and condensation cycle.

18 Claims, 10 Drawing Sheets

(56) References Cited

U.S. PATENT DOCUMENTS

| | | | | |
|---|---|---|---|---|
| 2004/0147769 A1* | 7/2004 | Davis | ............... | B01D 11/028 554/9 |
| 2014/0114084 A1* | 4/2014 | Hamler | ............... | B01D 11/00 554/20 |
| 2016/0201009 A1* | 7/2016 | Lopez | ............... | A61K 36/63 554/9 |
| 2017/0312327 A1* | 11/2017 | Jones | ............... | C11B 1/04 |
| 2017/0342467 A1* | 11/2017 | Regberg | ............... | C12Q 1/689 |
| 2019/0328806 A1* | 10/2019 | Rapp | ............... | B01D 11/0207 |
| 2020/0188812 A1* | 6/2020 | Galyuk | ............... | B01D 11/0288 |

* cited by examiner

US 11,491,416 B2

CRYOGENIC SOLID-LIQUID EXTRACTOR

CROSS-REFERENCE TO RELATED APPLICATIONS

This application claims the benefit of U.S. Provisional Application Ser. No. 62/680,055, filed Jun. 4, 2018, which is hereby incorporated by reference in its entirety.

FIELD OF THE INVENTION

Embodiments of the invention relate to the field of solid-liquid extraction. In particular, some embodiments of the invention relate to the solid-liquid extraction of plant or other organic material.

BACKGROUND OF THE INVENTION

Solid-liquid extraction is accomplished when solid material, such as, plant or organic matter, is exposed to a liquid solvent and soluble compounds contained in the solid material are extracted and dissolved into the liquid solvent.

Some organic materials, such as hemp, contain extractable materials that are both desirable (e.g., cannabinoids, terpenes, and plant resins) and undesirable (e.g., chlorophyll, waxes, and starches). Extraction techniques aim to avoid the dissolution of these undesirable components into the extraction solvent. One method to inhibit dissolving these components is to lower the temperature of the extraction process by super-cooling the solvent. Because these undesirable components are soluble in water and other polar solvents such as Ethanol, at sufficiently cold temperatures well below the freezing point of water, substantially only the desirable solvent-soluble components, but not the undesirable water-soluble components, are extracted. The water soluble compounds remain in the solid organic material.

Currently, electric coolers are conventionally used to lower temperatures in extractors. However, electric coolers are typically energy inefficient, slow at cooling the liquid solvent, provide poor heat transfer and circulation to the solvent and sample chamber, cumbersome to incorporate into a solid-liquid extractor, and expensive.

Accordingly, there is a longstanding need in the art for a more efficient, inexpensive, and practical mechanism to super-cool a solid-liquid extractor.

SUMMARY OF THE INVENTION

An inventive cryogenic solid-liquid extractor is provided which isolates extractable substances from plant or other organic material, while excluding water soluble materials such as chlorophyll, waxes, and starches by super-cooling an extraction chamber with a cryogenic cooling bath comprising a mixture of a solvent and a liquified or solidified gas.

According to some embodiments of the present invention, a cryogenic solid-liquid extractor, and method for operating the same, is provided. The cryogenic solid-liquid extractor comprises a reboiler for evaporating an extraction solvent; a cryogenic heat exchanger for condensing the vaporized extraction solvent to a liquid extraction solvent by passing the vaporized extraction solvent through a container cooled by a cryogenic cooling agent comprising a mixture of a cryogenic solvent and a compressed, liquified or solidified gas to cool the extraction solvent to a temperature below the freezing point of water and above the freezing point of the extraction solvent; a cryogenic extractor for passing the condensed liquid extraction solvent through the solid organic material to extract solvent-soluble material, but not water-soluble material, from the solid organic material; wherein the cryogenic solid-liquid extractor returns the condensed liquid extraction solvent containing extracted material to the reboiler to repeat the vaporization and condensation cycle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
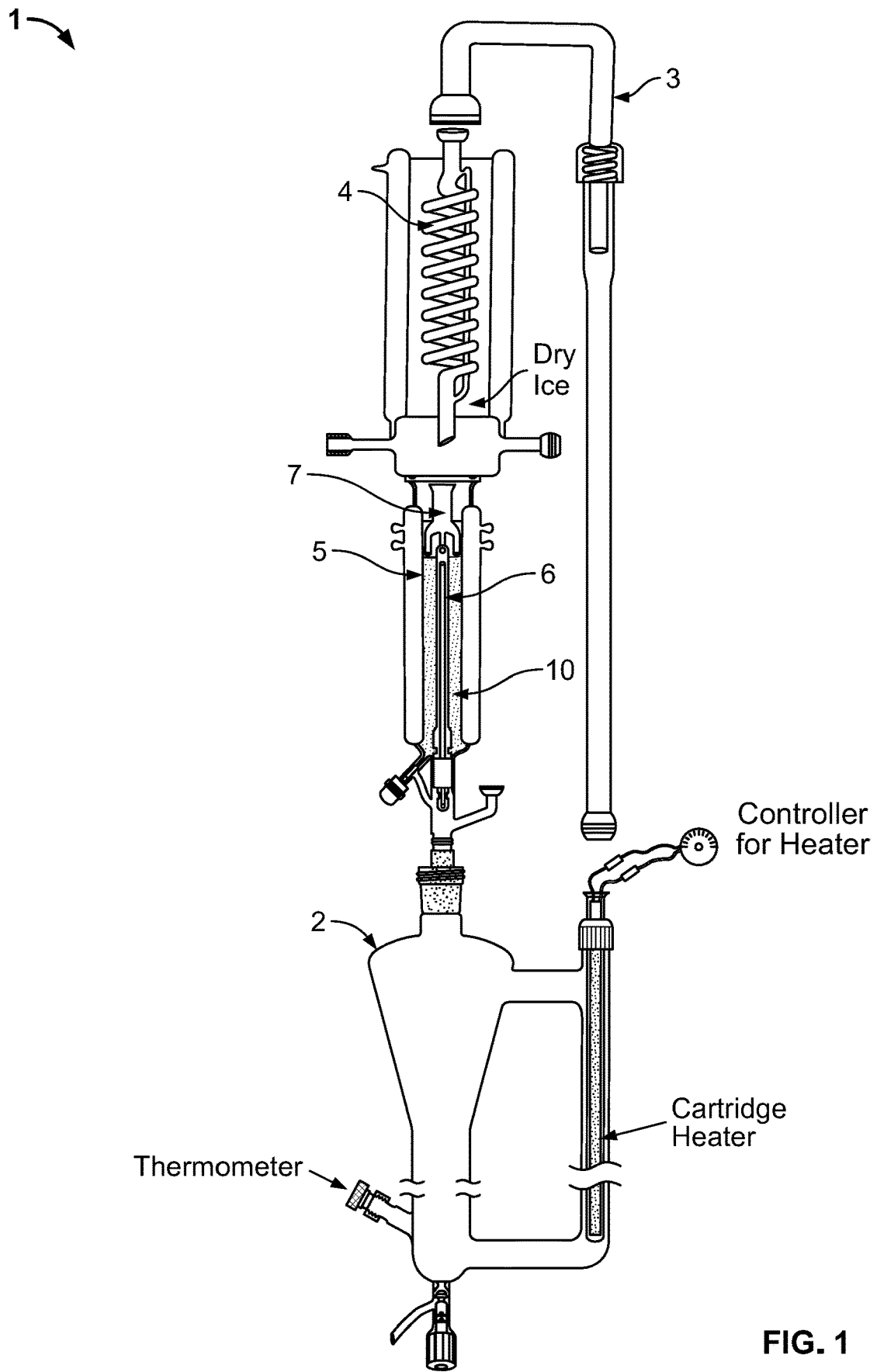
FIG. 1 schematically illustrates a cryogenic solid-liquid extractor 1, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

A solid-liquid extractor according to some embodiments of the present invention overcomes the aforementioned longstanding limitations of conventional extractors as follows:

Cryogenic Cooling: Cryogenic solid-liquid extractor 1 comprises a cryogenic heat exchanger 4 and a cryogenic extractor 5 cooled by a cryogenic cooling bath comprising a mixture of a solvent (e.g., acetone or ethanol) and a compressed, liquified or solidified gas (e.g., solid $CO_2$ ("dry ice") or liquid $N_2$ ("liquid nitrogen"). The heat exchanger 4 passes the vaporized solvent through the inner surface of the condensing coil 16, which sits in the cryogenic cooling bath 18 outside the outer surface of the condensing coil 16. The vaporized solvent is thereby exposed to the cryogenic cooling bath, cooling and condensing the vaporized solvent to liquid solvent. The cryogenic cooling bath fully immerses the vaporized solvent to super-cool and condense the solvent. The condensate of liquefied solvent is sufficiently cold to selectively extract the solvent-soluble (but not water-soluble) parts of the solid material in the extractor body 10. The solvent thus remains dry (e.g., no water, or water-soluble materials) and does not contact air (e.g., due to the vacuum system). The cryogenic heat exchanger 4 cools the solvent to well below the freezing point of water (e.g., less than −20 degrees Celsius (° C.), less than −40° C., less than −60° C., and/or less than 80° C.) to avoid extracting undesirable material (e.g., plant waxes, starches, etc.). In one example, a cryogenic bath of ethanol and dry ice achieves a temperature of approximately −78° C. The cryogenic bath typically achieves colder temperatures faster than electric coolers and cools the solvent almost instantly. Achieving comparable temperatures with an electric chiller would use a great amount of power, take longer to cool, have poorer heat transfer or circulation, and be cumbersome to integrate into the extractor.

Continuous Cycling: Solvent is first input into the reboiler 2 where it is vaporized from liquid to gas, then passes through the heat exchanger 4 coil 16 where it is cooled and condensed from gas back into liquid, super cooled, then passes through the extractor 5 and returns back to the reboiler 2 to repeat the cycle. This continuous circulation stream returns cool liquid into the reboiler 2 drop-by-drop, which allows the cryogenic extractor 5 to be operated at a truly continuous rate. Because the reboiler 2 is exposed to a steady flow of recycled solvent which is preheated by the vaporized solvent which contacts the vapor trap at the bottom of the return line 6, it requires less energy and heating time to re-vaporize the solvent, as compared to conventional batch cycling, in which cool liquid is introduced into the reboiler by emptying the whole extractor at once. Continuous cycling thus allows controlled flow of the condensed, super cooled solvent, which is more energy efficient (uses less heat) and faster (uses less heating time to re-boil) than conventional batch cycling.

New internal solvent distributor 6: Acts as a level control device with an input port 22 positioned at a relatively low height (e.g., closer to the distributor's base) and a return port 24 positioned at a relatively higher position (e.g., closer to the distributor's top). This overflow device allows the liquid solvent to flow unidirectionally, from the cryogenic extractor 5 to the reboiler 2, but not the backflow of vapor in the opposite direction from the reboiler 2 to the cryogenic extractor 5. The internal solvent distributor 6 is thus a vapor trap for the reboiler 2, preventing heat or vapor from the reboiler 2 from entering and warming the extract in the cryogenic extractor 5. The overflow drainage and condensate reach an equilibrium, such that when a drop of solvent is added to the cryogenic extractor 5, a drop of solvent plus extracted compounds is released through the output port 24.

Pre-Charge Solvent: The solvent (e.g., ethanol) to be charged to the cryogenic extractor 5 should be pre-cooled in a separate vessel that is immersed in a cryogenic cooling bath comprising a mixture of a solvent and a liquified or solidified gas, e.g., in a Dewar flask or other suitable container. This pre-cooling of the solvent prevents the plant material column in the cryogenic extractor 5, from ever contacting solvent that is above cryogenic temperature. The heat exchanger reservoir should be filled to a suitable level with a solvent (e.g., acetone), and the liquified or solidified gas (e.g., dry ice) may be added to bring the coil 16 (or heat exchanger surfaces) to cryogenic temperature before starting the reboiler 2 so the solids to be extracted do not contact solvent above cryogenic temperature.

Cleaner extraction: Continuous cycling also cleans the solvent by transforming it into a pure vapor. Thus, the solid materials in the extractor are only exposed to purified solvent (without any or trace amounts of extracted material). Pure solvent extracts faster and more efficiently than solvent contaminated with extracted material as occurs when extraction is accomplished by dumping the solids to be extracted and the extraction solvent in a vessel and mixing.

Higher extract concentration: Because the solvent is continuously recirculated, only a small amount of solvent may initially be introduced into the reboiler to start the extraction process. As the solvent cycles through the extractor, it is reused continuously. Accordingly, the extract concentration in the solvent increases as the solvent continuously passes through the extractor body. The extraction process may be run for some period of time to yield a sufficiently high concentration of (e.g., 10:1) solvent:extract. A desired concentration can be tuned by adjusting the ratio of the solvent to extract (e.g., decreasing the amount of solvent for increasing extract concentration) and/or adjusting the extraction time or number of cycles.

Reference is made to FIG. 1, which schematically illustrates a cryogenic solid-liquid extractor 1, according to an embodiment of the invention. The cryogenic solid-liquid extractor 1 isolates extractable substances from plant or other organic material, while excluding water soluble materials such as chlorophyll, waxes, and starches, due to the low temperature in the extraction chamber 5. Cryogenic solid-liquid extractor 1 is designed to contain a solid material 10, such as hemp, in an insulated chamber 5 where it is extracted with a solvent that is cooled by a cryogenic cooling agent comprising a mixture of a solvent and a liquified or solidified gas, such as an acetone-dry ice mix. The cryogenic cooling agent keeps the temperature of the extraction chamber 5 far below the freezing point of water for the duration of the extraction process.

Figure 2:
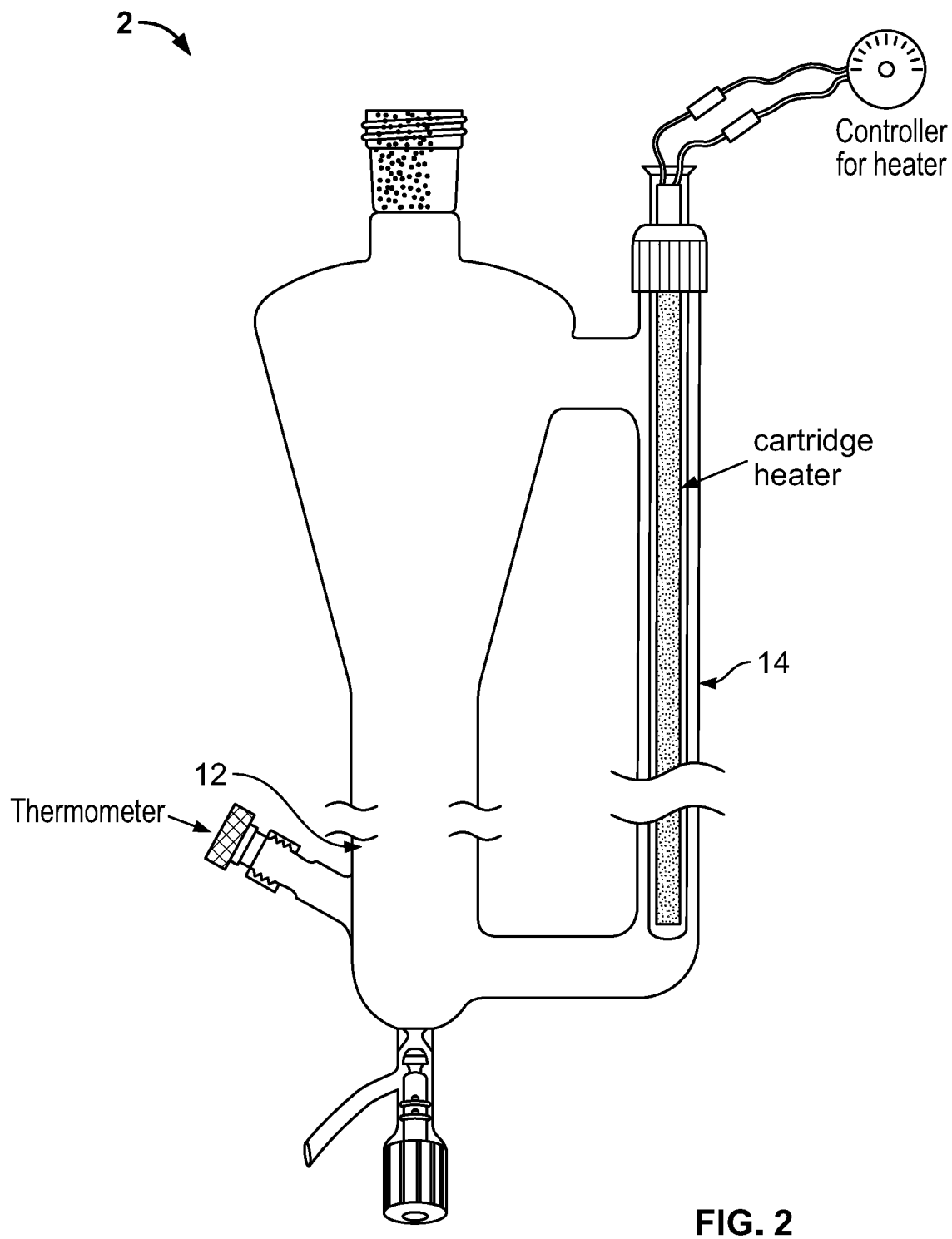
FIG. 2 schematically illustrates a reboiler 2 of the cryogenic solid-liquid extractor of FIG. 1, according to an embodiment of the invention.

Reference is made to FIG. 2, which schematically illustrates a reboiler 2 of the cryogenic solid-liquid extractor of FIG. 1, according to an embodiment of the invention. The solvent is added to the chamber 12 of the reboiler 2 (also referred to as a "thermal siphon reboiler") after the material to be extracted has been chilled to a temperature well below the freezing point of water (0° C.) by adding chilled solvent to the extractor body containing the solids, cooling them to a temperature between −40° C. and −60° C. Once the solvent is added to the overflow point, the extractor 1 is sealed by placing the heat exchanger 4 on top of the extractor and connecting the vapor vent line 3 to the heat exchanger 4, a controlled vacuum can be applied and the extraction solvent in the reboiler is heated to the point of vaporization. The extraction solvent is vaporized by applying heat generated by the heating element in the recycle line 14 of the thermal siphon reboiler. This causes the solvent to be recirculated, agitated, and refreshed while sending vapors up to the heat exchanger 4 through the vapor vent line 3. Operating the system under a partial vacuum allows the extraction to be run at much lower temperatures which can protect any heat sensitive compounds in the reboiler 2.

Figure 3:
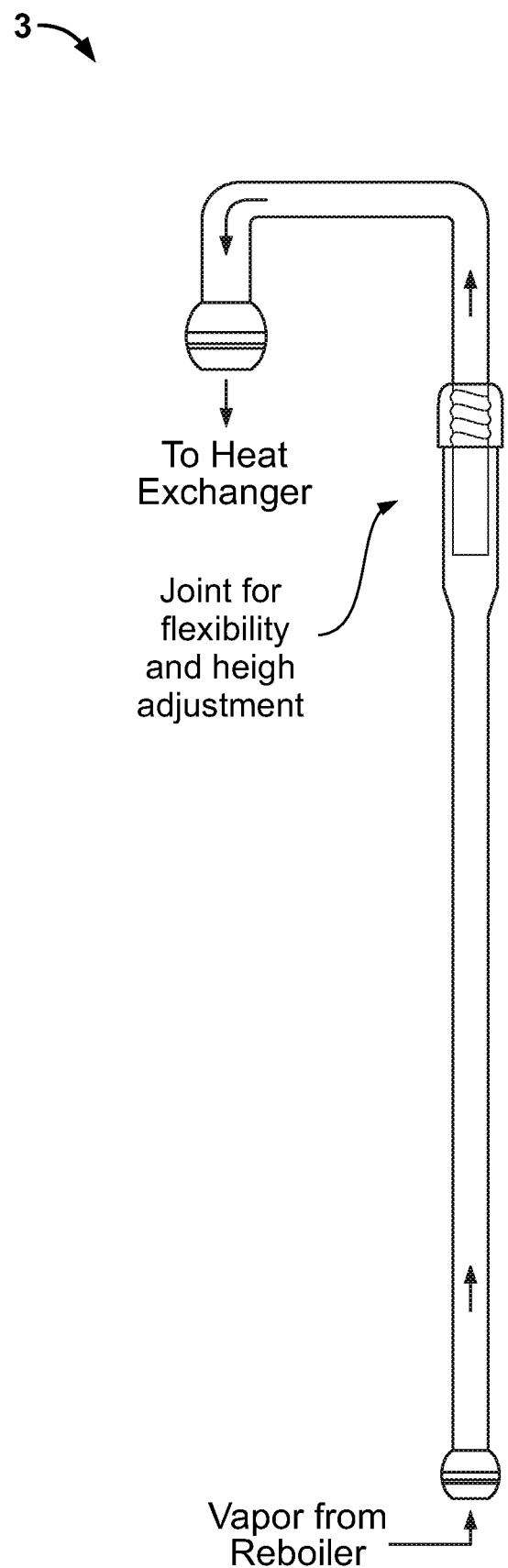
FIG. 3 schematically illustrates a vapor vent line 3 of the cryogenic solid-liquid extractor of FIG. 1, according to an embodiment of the invention.

Reference is made to FIG. 3, which schematically illustrates the vapor vent line 3 of the cryogenic solid-liquid extractor of FIG. 1, according to an embodiment of the invention. The vapor travels upward along the vapor vent line 3 to a heat exchanger 4.

Figure 4A:
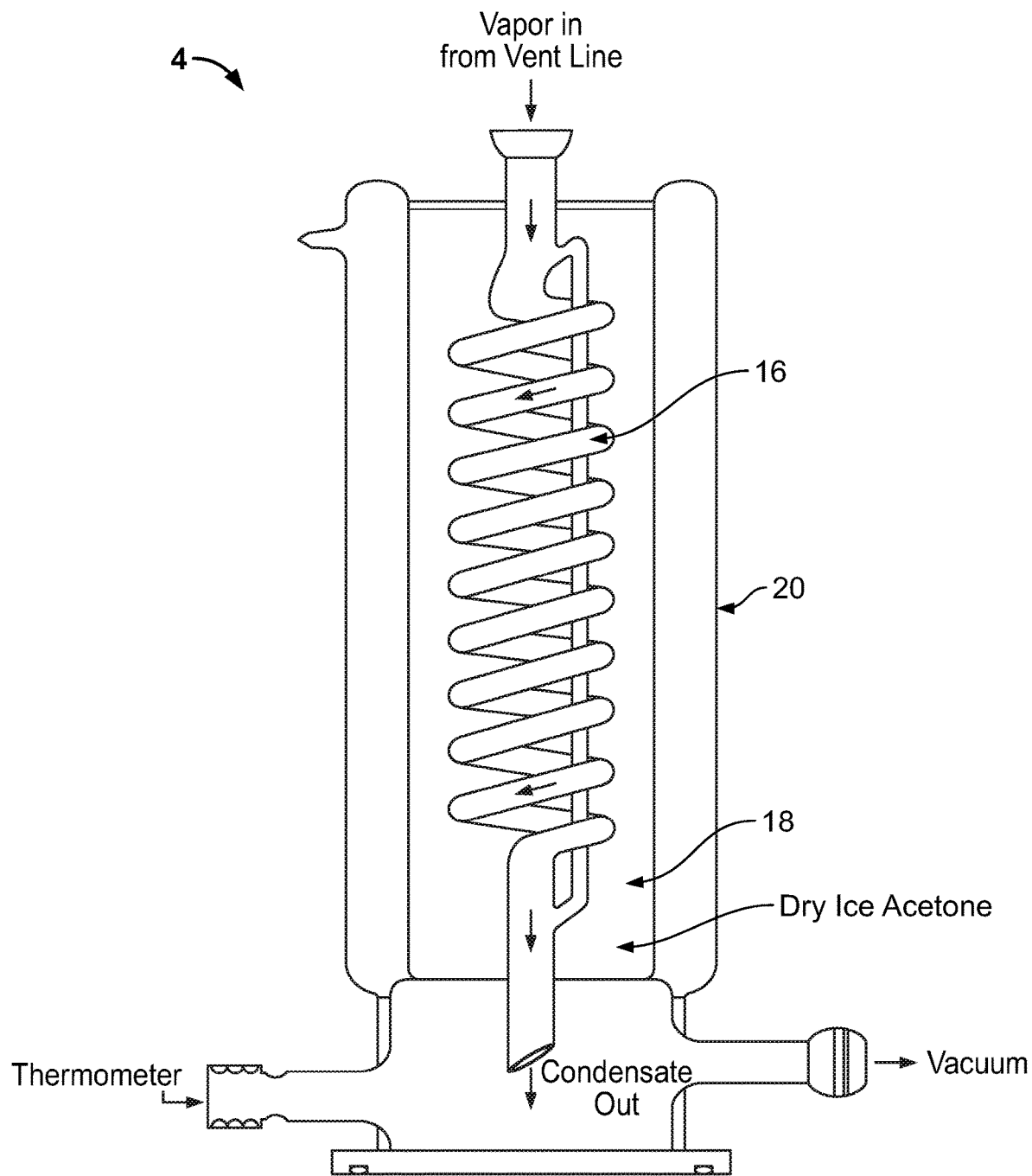
FIGS. 4A-4B schematically illustrate various designs of a cryogenic heat exchanger 4 of the cryogenic solid-liquid extractor of FIG. 1, according to various embodiments of the invention.
Figure 7:
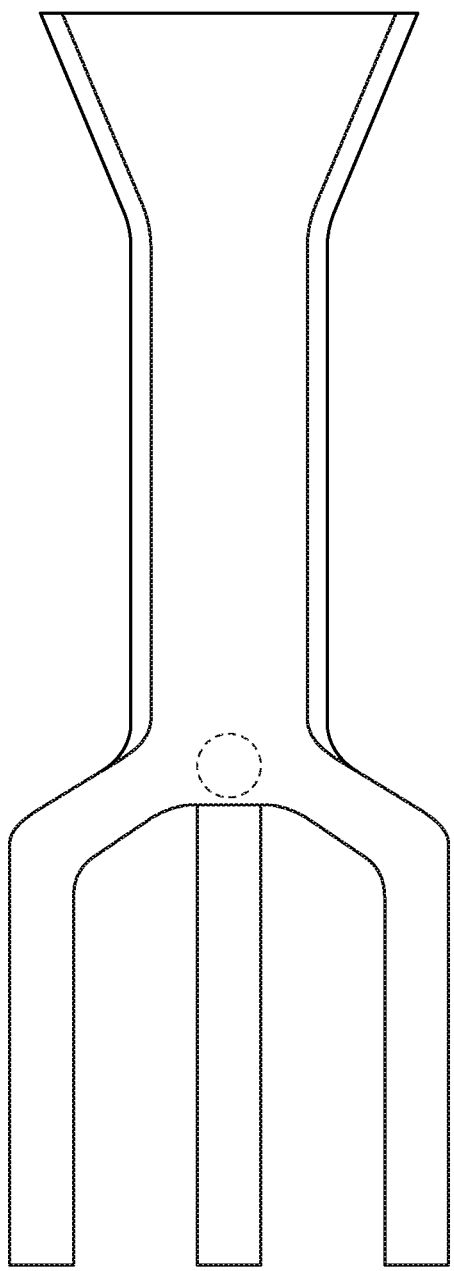
FIG. 7 schematically illustrates a condensate distributor 7 in the cryogenic solid-liquid extractor of FIG. 1, according to an embodiment of the invention.

Reference is made to FIG. 4A, which schematically illustrates the heat exchanger 4 of the cryogenic solid-liquid extractor of FIG. 1, according to an embodiment of the invention. The heat exchanger 4 comprises a condensing and cooling coil 16. Condensing coil 16 passes the vapor through the inside channel of the coil which sits in a cooling bath 18 on the outside of the coil. A well-insulated cavity wall 20 maintains the low temperature by encompassing the cooling bath in a vacuum jacket. The vapor passing through the coil 16 is condensed and chilled to a very low temperature due to residence time in the heat exchanger 4. When the solvent exits the heat exchanger 4, it is well below the freezing point of water thus preventing the extraction of any water-soluble components from the solid 10. The chilled solvent exits the heat exchanger 4, passes through the condensate distributor 7 of FIG. 7, and enters the extraction chamber 5.

Figure 4B:
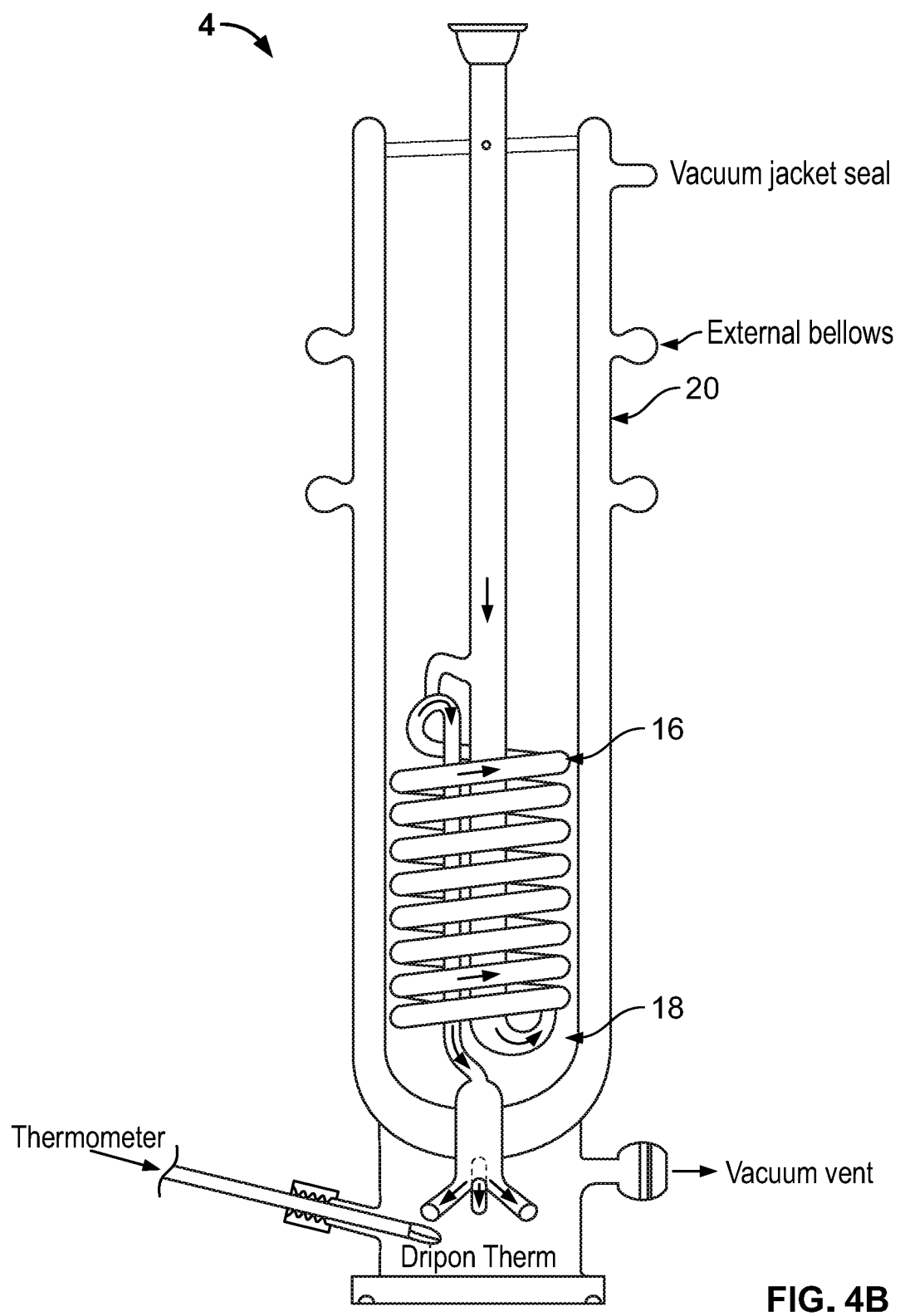

Reference is made to FIG. 4B, which schematically illustrates another design for the heat exchanger 4 of the cryogenic solid-liquid extractor of FIG. 1, according to an embodiment of the invention. The heat exchanger 4 of FIG. 4B is similar to that of FIG. 4A, except that it uses a different configuration of coils and tubes to result in a greater retention time for contact of the condensate with the super cooled bath coils, thus giving the condensate additional time to reach the desired temperature, resulting in improved cooling.

Figure 5A:
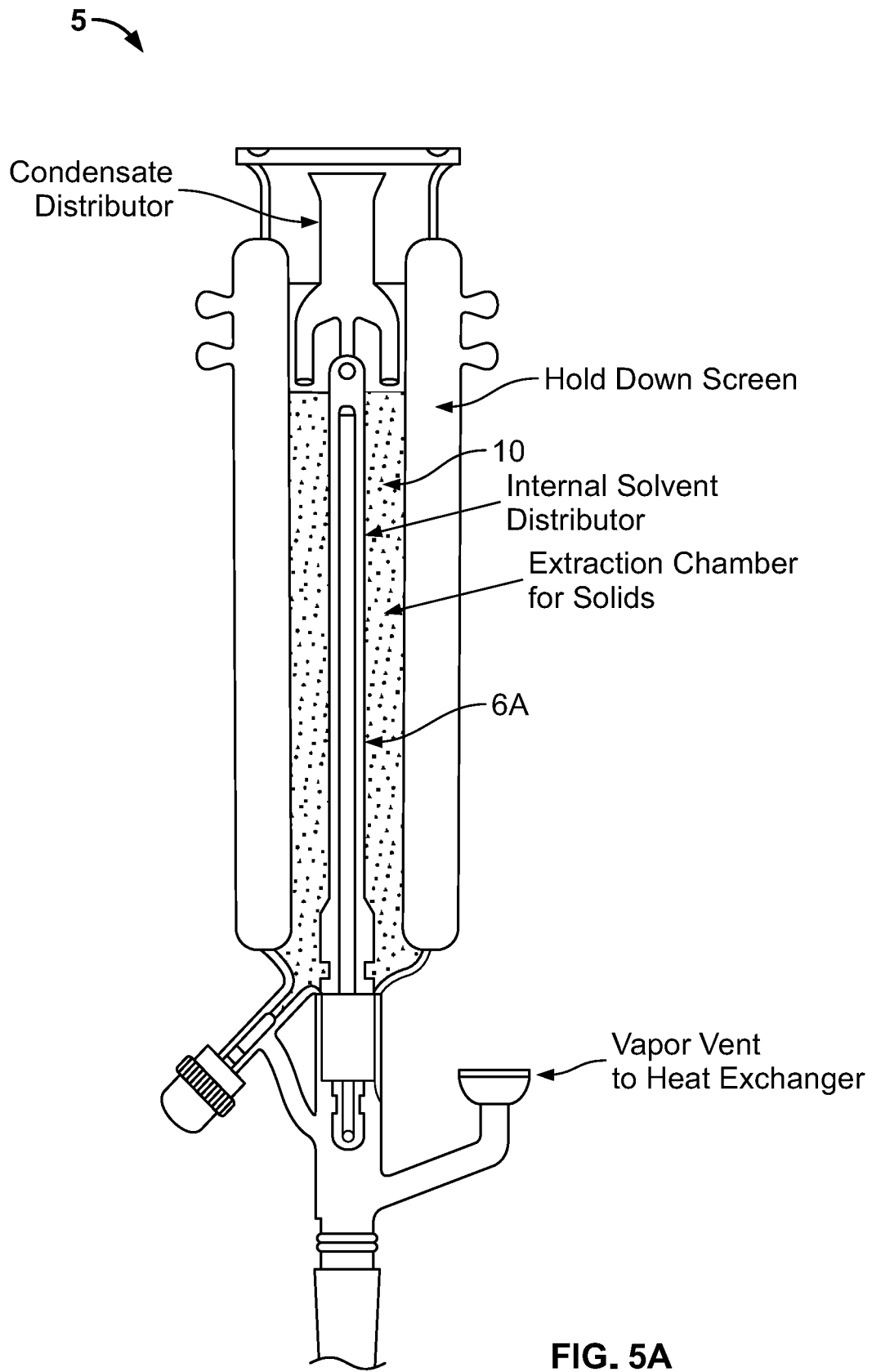
FIGS. 5A-5C schematically illustrate various designs of a cryogenic extractor 5 in the cryogenic solid-liquid extractor of FIG. 1, according various embodiments of the invention.

Reference is made to FIG. 5A, which schematically illustrates the cryogenic extractor 5 in the cryogenic solid-liquid extractor of FIG. 1 with an internal solvent distributor 6A, according to an embodiment of the invention. The cryogenic extractor 5 contains the material 10 to be extracted. Cooled solvent from the heat exchanger 4 enters the cryogenic extractor 5 and trickles down through the material 10. When the extraction solvent reaches the bottom of the extraction chamber 5, it flows through a filter and openings at the base of the overflow line and is pushed up by liquid level differential through a tube within a tube of internal solvent distributor 6 located in the center of the extraction chamber 5.

Figure 5B:
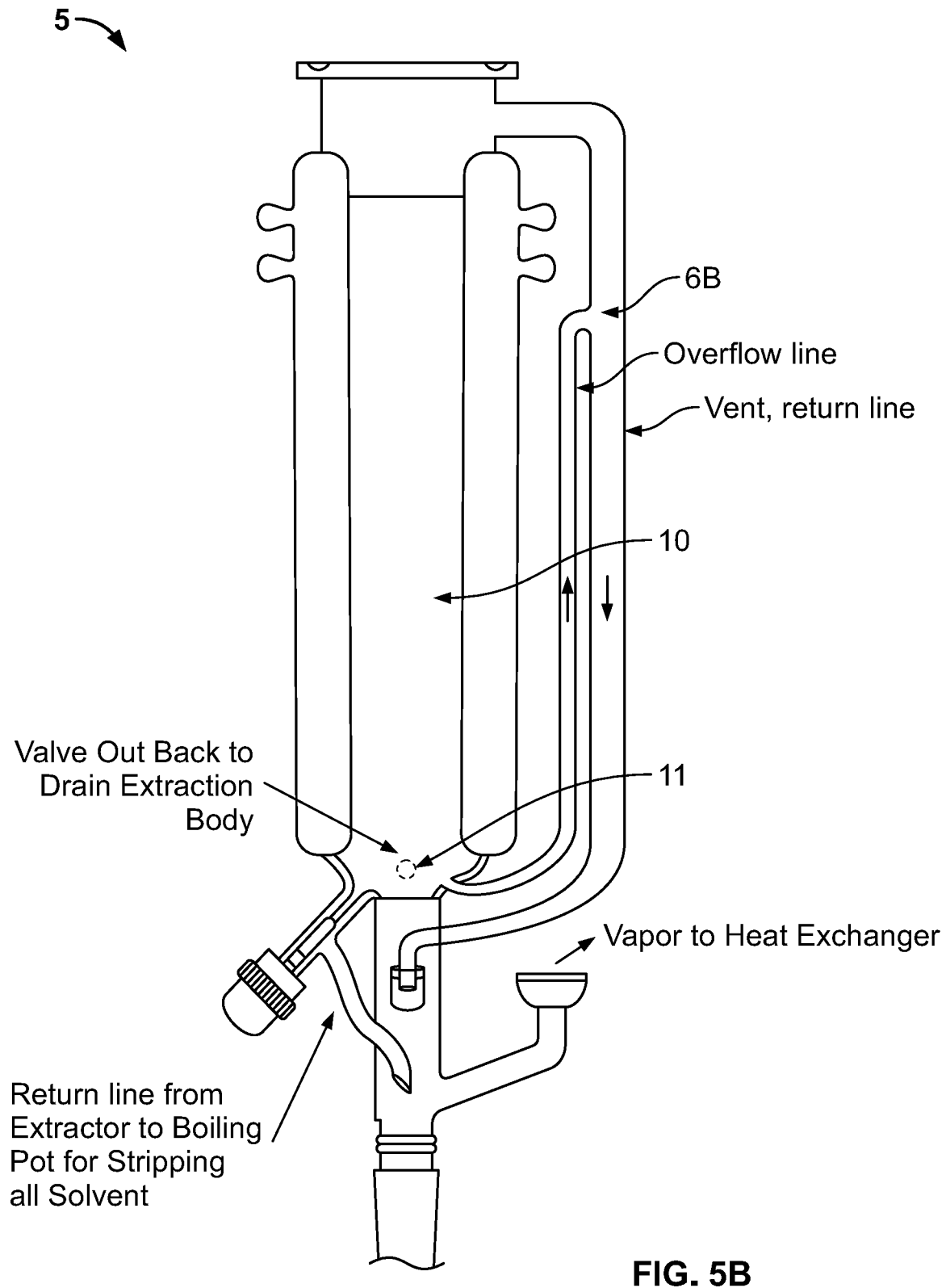

Reference is made to FIG. 5B, which schematically illustrates the cryogenic extractor 5 in the cryogenic solid-liquid extractor of FIG. 1 with an external solvent distributor 6B, according to an embodiment of the invention. The cryogenic extractor 5 in FIG. 5B operates the same as that in FIG. 5A, except it has an external solvent distributor 6B (instead of an internal solvent distributor 6A), which allows the use of a simple filter bag to be placed in the extractor cavity to hold the material 10 to be extracted. The cryogenic extractor 5 in FIG. 5B also includes an additional drain valve 11, which may return the solvent to the reboiler 2 to be stripped instead of draining it to an external container.

Figure 5C:
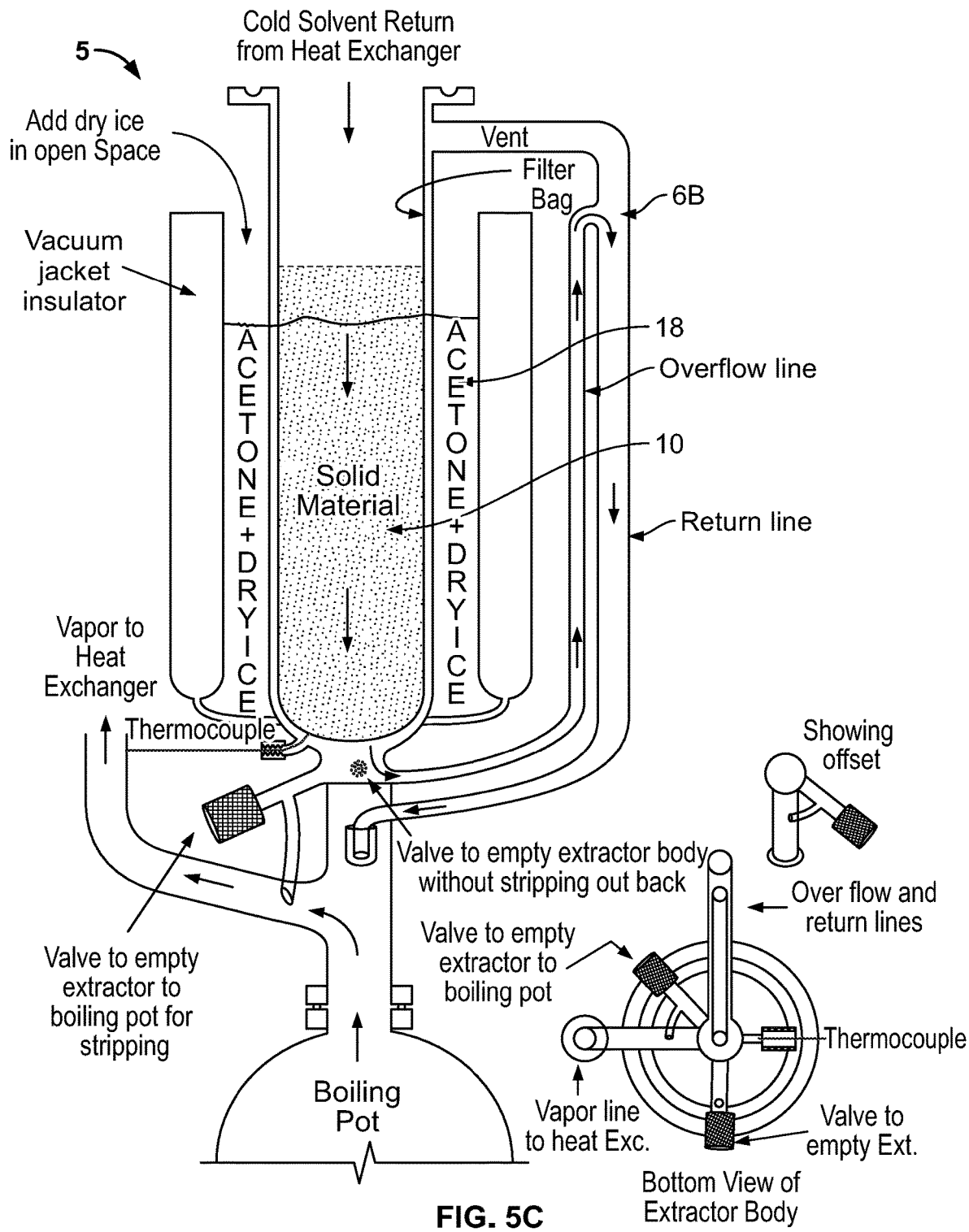

Reference is made to FIG. 5C, which schematically illustrates another design for a cryogenic extractor 5 in the cryogenic solid-liquid extractor of FIG. 1, according to an embodiment of the invention. The cryogenic extractor 5 of FIG. 5C is a metal extractor with a cryogenic cooling bath 18 between the extractor body and the insulating external capsule that surrounds the extractor body. This allows the whole extractor body to be pre-chilled so that the material 10 to be extracted maintains temperatures continuously below freezing. Chilling the extractor body and material 10 in a freezer may prevent extraction of chlorophyll and other such components during startup.

Figure 6:
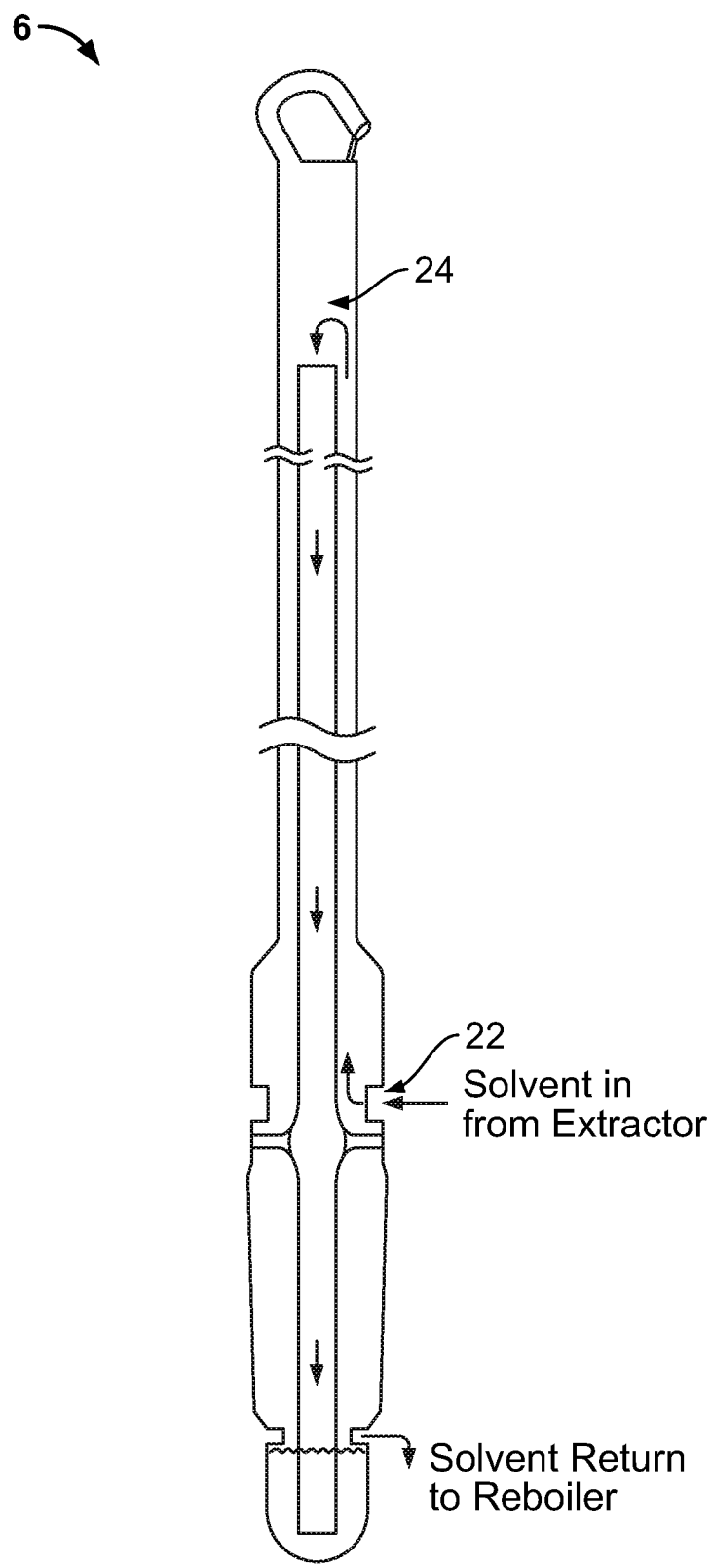
FIG. 6 schematically illustrates an internal solvent distributor 6 of the cryogenic extractor of FIGS. 1 and 5A, according to an embodiment of the invention.

Reference is made to FIG. 6, which schematically illustrates the internal solvent distributor 6 of the cryogenic extractor of FIGS. 1 and 5A, according to an embodiment of the invention. The internal solvent distributor 6 acts as an overflow drain allowing solvent to flow only in one direction (shown by arrows in FIG. 6) upwards through the annulus, then downwards through the inner channel, but not allowing any backflow of vapor from the reboiler 2 back into the extraction chamber 5. The internal solvent distributor 6 is configured with an input port 22 at a relatively lower position near the base of the internal solvent distributor 6 and an output port 24 at a relatively higher position on the internal solvent distributor. The input port 22 intakes solvent from the cryogenic extractor 5 flowing upwards to fill the outer channel of the internal solvent distributor 6 until the solvent reaches the relatively higher position of the output port 24 and exits through the inner concentric channel of the internal solvent distributor 6 flowing downwards into the reboiler 2. The internal solvent distributor 6 acts as a liquid/vapor trap to prevent gases generated in the reboiler 2 from contacting the overflow and return tube.

After returning to the reboiler 2, the extraction process may repeat. The solvent may be re-vaporized and recycled for some period of time until the extraction process is complete. At the end of the extraction process, the fluid is drained from the reboiler 2, and the extract may be separated from the solvent.

At no time during the extraction process is the solvent in contact with the solid material outside of the very cold extraction chamber 5. The internal solvent distributor 6 acts as a liquid/vapor trap to prevent vapor or heat from the reboiler 2 re-entering the cryogenic extractor 5 and warming of the solvent during the extraction.

Advantages of the inventive cryogenic solid-liquid extractor:

The cryogenic solid-liquid extractor allows for the cryogenic extraction of solid materials with various solvents without the need for expensive electric chillers. All of the chilling of the solvent is accomplished by using a cooling agent, such as, solid $CO_2$ ("dry ice") or liquid nitrogen, mixed with a solvent, such as acetone. Once the initial charge of chilled solvent is poured into the extraction chamber, the vaporized recycling solvent is chilled by passing it through a heat exchanger that is immersed in a bath of dry ice mixed with a solvent such as acetone. The low temperature in the heat exchanger bath may be maintained by adding dry ice as it sublimes. In some embodiments, no additional cooling may be used, while in other embodiments, cooling may be augmented by additional methods.

In some embodiments, the system is grease-free: No silicone grease needs to be used in the system. This is accomplished by the use of ground glass joints and screwed closures that incorporate "O-rings" to seal the joints of the extractor. These seals prevent contaminating the extracted material with silicone grease.

The temperature of the extraction solvent in the reboiler during the extraction can be controlled by the use of vacuum to lower the boiling point. By reducing the pressure with a controlled vacuum provided by a vacuum pump, the temperature of the extraction solvent can be lowered to room temperature or less if desired to protect the extracted material which is in the reboiler. The vacuum connection is located between the overhead heat exchanger and the extraction body so there is little opportunity for vapors to escape the system. A cold trap may be incorporated in the line between the extractor and the vacuum pump to catch any vapors that might escape.

Use of a thermal siphon reboiler: The thermal siphon reboiler is incorporated in the system to control the boil up rate of the extraction solvent and facilitate the reduction of the amount of solvent that has to be stripped in order to recover the extracted product. Use of a cartridge heater instead of a conventional heating mantle provides much better control of the boil up rate due to a substantial reduction in the mass of the heating unit. This facilitates a faster response at the point of heat transfer into the solvent. At the end of the extraction process, virtually all of the product that can be extracted may be in the reboiler in a relatively small amount of solvent. The solvent remaining in the extractor body will typically have little or no desirable extract product left in it. This is due to the fact that the solvent comes out of the reboiler as a vapor and cycles through the material to be extracted as a virtually pure solvent, having been converted to a gas before being condensed and then passing through the bed of solids to be extracted. Once the extraction is complete, the reboiler can be removed from the extractor and the solvent remaining in the extraction chamber drained into a suitable storage container and tightly sealed to be reused. In some embodiments, the remaining solvent from the extractor body will be substantially water-free having been kept cold in the extractor. Also, it should have little of the product that was being extracted due to fresh solvent passing through the extractor as it cycles. This should be able to be used in subsequent extractions and should facilitate the near complete recovery of product in subsequent batches due to any product remaining in the used solvent reaching equilibrium at the end of each extraction.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A cryogenic solid-liquid extractor comprising:
    a reboiler for evaporating an extraction solvent;
    a cryogenic heat exchanger for condensing the vaporized extraction solvent to a liquid extraction solvent by passing the vaporized extraction solvent continuously through a heat exchanger coil which is immersed in a container cooled by a cryogenic cooling agent comprising a mixture of a cryogenic solvent and at least one of a solidified gas, or a liquefied gas, to cool the extraction solvent to a temperature below the freezing point of water and above the freezing point of the extraction solvent;
    a cryogenic extractor for passing the condensed liquid extraction solvent continuously through a solid organic material to extract solvent-soluble material, but not water-soluble material, from the solid organic material,
    wherein the cryogenic solid-liquid extractor returns the condensed liquid extraction solvent containing extracted material to the reboiler continuously to repeat the vaporization and condensation cycle; and
    a solvent distributor to cause a continuous unidirectional flow of the liquid extraction solvent from the cryogenic extractor to the reboiler and to prevent the vaporized extraction solvent from flowing in a direction from the reboiler to the cryogenic extractor.

2. The cryogenic solid-liquid extractor of claim 1 wherein the solvent distributor comprises:
    an input port at a relatively lower position on the solvent distributor; and
    an output port at a relatively higher position on the solvent distributor,
    wherein the input port intakes solvent from the cryogenic extractor flowing upwards to fill the solvent distributor until the extraction solvent reaches the relatively higher position and exits the output port to re-enter the reboiler.

3. The cryogenic solid-liquid extractor of claim 1, wherein the container comprises an insulated vessel cooled by a cryogenic cooling agent having a condensing coil immersed in a cooling agent.

4. The cryogenic solid-liquid extractor of claim 3, wherein the vaporized, condensed extraction solvent passes through an interior channel of the condensing/heat exchanger coil and the cryogenic cooling agent surrounds an exterior surface of the condensing/heat exchanger coil.

5. The cryogenic solid-liquid extractor of claim 1 comprising a vacuum configured to lower the boiling point temperature for vaporizing the extraction solvent.

6. The cryogenic solid-liquid extractor of claim 1, wherein the cryogenic cooling agent is a cryogenic cooling bath comprising a mixture of dry ice and at least one of acetone or another solvent, or liquid nitrogen.

7. The cryogenic solid-liquid extractor of claim 1, wherein at least one of a solidified gas comprises dry ice.

8. The cryogenic solid-liquid extractor of claim 1, wherein the at least one of liquified gas or solidified gas comprises liquid Nitrogen.

9. The cryogenic solid-liquid extractor of claim 1, wherein the extraction solvent is initially pre-cooled before first entering the cryogenic extractor.

10. A method for cryogenic solid-liquid extraction comprising:
    evaporating an extraction solvent at a reboiler;
    condensing the vaporized extraction solvent to a liquid extraction solvent by passing the vaporized extraction solvent through a condenser/heat exchanger coil mounted in a container cooled by a cryogenic cooling agent comprising a mixture of a cryogenic solvent and a solidified gas, or a liquefied gas to cool the extraction solvent to a temperature below the freezing point of water and above the freezing point of the extraction solvent;
    passing the condensed liquid extraction solvent through an extraction chamber containing solid organic material to extract solvent-soluble material, but not water-soluble material, from the solid organic material;
    passing the liquid extraction solvent through a solvent distributor to cause a continuous unidirectional flow of the liquid extraction solvent from a cryogenic extractor to the reboiler and to block the vaporized extraction solvent from flowing in a direction from the reboiler to the cryogenic extractor; and
    returning the condensed liquid extraction solvent containing extracted material to the reboiler to repeat the vaporization and condensation cycle in a completely continuous flow, without pauses or storage in a reservoir, using a vacuum connected at the interface between the condenser/heat exchanger and the extraction chamber, so that the vacuum is in communication with all internal areas at all times during the extraction.

11. The method of claim 10 wherein the solvent distributor is an internal solvent distributor.

12. The method of claim 10 comprising passing the vaporized extraction solvent through a condensing coil during the condensing and cooling step.

13. The method of claim 12 comprising passing the vaporized extraction solvent through an interior channel of the condensing coil, where the cryogenic cooling agent surrounds an exterior surface of the condensing coil.

14. The method of claim 10 comprising operating a vacuum to lower the boiling point temperature for vaporizing the extraction solvent.

15. The method of claim 10, wherein the cryogenic cooling agent is a cryogenic cooling bath comprising a mixture of dry ice and at least one of acetone or another solvent, or liquid nitrogen.

16. The method of claim 10, wherein the at least one of: liquified or solidified gas comprises dry ice.

17. The method of claim 10, wherein the at least one of liquefied or solidified gas comprises liquid Nitrogen.

18. The method of claim 10 comprising initially pre-cooling the extraction solvent before first entering the passing step.

* * * * *